United States Patent
Frache et al.

(10) Patent No.: US 9,611,366 B2
(45) Date of Patent: Apr. 4, 2017

(54) PROCESS FOR MANUFACTURING FLUOROPOLYMER HYBRID COMPOSITES

(71) Applicant: SOLVAY SA, Brussels (BE)

(72) Inventors: Alberto Frache, Alessandria (IT); Jennifer Katty Tata, Turin (IT); Giovanni Camino, Turin (IT); Giambattista Besana, Mariano Comense (IT); Julio A. Abusleme, Saronno (IT)

(73) Assignee: SOLVAY SA, Brussels (BE)

( * ) Notice: Subject to any disclaimer, the term of this patent is extended or adjusted under 35 U.S.C. 154(b) by 165 days.

(21) Appl. No.: 14/439,905

(22) PCT Filed: Oct. 22, 2013

(86) PCT No.: PCT/EP2013/072067
§ 371 (c)(1),
(2) Date: Apr. 30, 2015

(87) PCT Pub. No.: WO2014/067816
PCT Pub. Date: May 8, 2014

(65) Prior Publication Data
US 2015/0284519 A1    Oct. 8, 2015

(30) Foreign Application Priority Data

Oct. 31, 2012   (EP) .................................. 12190802

(51) Int. Cl.
| | | |
|---|---|---|
| C08J 5/00 | (2006.01) |
| C08K 3/00 | (2006.01) |
| C08K 5/05 | (2006.01) |
| C08J 3/20 | (2006.01) |
| C08J 3/205 | (2006.01) |

(52) U.S. Cl.
CPC ............... *C08J 5/00* (2013.01); *C08J 3/201* (2013.01); *C08J 3/2056* (2013.01); *C08K 3/0033* (2013.01); *C08K 5/05* (2013.01); *C08J 2327/16* (2013.01); *C08J 2327/18* (2013.01)

(58) Field of Classification Search
CPC ... C08J 3/201; C08J 3/2056; C08J 5/00; C08J 2327/16; C08J 2327/18; C08K 3/033; C08K 5/05
See application file for complete search history.

(56) References Cited

U.S. PATENT DOCUMENTS

| | | | |
|---|---|---|---|
| 3,514,425 A | 5/1970 | Engelhardt |
| 2009/0005518 A1 | 1/2009 | Just et al. |

FOREIGN PATENT DOCUMENTS

| | | |
|---|---|---|
| CN | 1806012 A | 7/2006 |
| WO | 2011121078 A1 | 10/2011 |

OTHER PUBLICATIONS

Bescher E.P. et al., "Fluorinated Copolymer-Oxide Hybrids", Journal of Sol-Gel Science and Technology, Dec. 1, 2004 (Dec. 1, 2004), vol. 32, No. 1-3, pp. 69-72, XP019212863, ISSN: 1573-4846, DOI: 10.1007/S10971-004-5767-7—Kluwer Academic Publishers, BO.

Liu X. et al., "A new method to prepare organic-inorganic hybrid membranes", Desalination, Jan. 19, 2008 (Jan. 19, 2008), vol. 221, No. 1-3, pp. 376-382, XP022426580, ISSN: 0011-9164, DOI: 10.1016/J.DESAL.2007.02.056—Elsevier, Amsterdam, NL.

Otsuka T. et al., "Synthesis of transparent poly(vinylidene fluoride) (PVdF)/zirconium oxide hybrids without crystallization of PVdF chains", Polymer, Jul. 3, 2009 (Jul. 3, 2009), vol. 50, No. 14, pp. 3174-3181, XP026235965, ISSN: 0032-3861, DOI: 10.1016/J.POLYMER.2009.05.018 [retrieved on May 20, 2009]—Elsevier Science Publishers B.V, GB.

*Primary Examiner* — Nicole M Buie-Hatcher

(57) ABSTRACT

The invention pertains to a process for manufacturing a fluoropolymer hybrid organic/inorganic composite comprising: (i) partially hydrolyzing and/or polycondensing, in the presence of an aqueous medium, a metal compound of formula (I): X4-mAYim, wherein X is a hydrocarbon group, Y is a hydrolysable group selected from the group consisting of an alkoxy group, an acyloxy group and a hydroxyl group, A is a metal selected from the group consisting of Si, Ti and Zr, and m is an integer from 1 to 4, so as to obtain an aqueous medium comprising a pre-gelled metal compound comprising one or more inorganic domains consisting of ≡A-O-A≡ bonds and one or more residual hydrolysable groups Y [compound (M)], and then (ii) reacting in the molten state at least a fraction of hydroxyl groups of a functional fluoropolymer [polymer (F)] with at least a fraction of hydrolysable groups Y of said pre-gelled metal compound [compound (M)], so as to obtain a fluoropolymer hybrid organic/inorganic composite. The invention also pertains to uses of said fluoropolymer hybrid organic/inorganic composite in several applications.

20 Claims, No Drawings

PROCESS FOR MANUFACTURING FLUOROPOLYMER HYBRID COMPOSITES

This application is a U.S. national stage entry under 35 U.S.C. §371 of International Application No. PCT/EP2013/072067 filed Oct. 22, 2013, which claims priority to European application No. 12190802.4 filed on Oct. 31, 2012. The entire contents of these applications are explicitly incorporated herein by this reference.

TECHNICAL FIELD

The present invention pertains to a process for manufacturing fluoropolymer hybrid composites and to uses thereof for several applications.

BACKGROUND ART

Organic-inorganic polymer hybrids, wherein inorganic solids on a nano or molecular level are dispersed in organic polymers, have raised a great deal of scientific, technological and industrial interests because of their unique properties.

To elaborate organic-inorganic polymer hybrid composites, a sol-gel process using metal alkoxides is the most useful and important approach. By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds. The polymer can enhance the toughness and processability of otherwise brittle inorganic materials, wherein the inorganic network can enhance scratch resistance, mechanical properties and surface characteristics of said hybrids.

Hybrids made from sol-gel technique starting from fluoropolymers, in particular from vinylidene fluoride polymers are known in the art.

For instance, WO 2011/121078 (SOLVAY SOLEXIS S.P.A.) Jun. 10, 2011 discloses a process for the manufacture of fluoropolymer hybrid organic-inorganic composites wherein at least a fraction of hydroxyl groups of a fluoropolymer are reacted in solution or in molten state with at least a fraction of hydrolysable groups of a metal compound of formula $X_{4-m}AY_m$ (X is a hydrocarbon group, Y is a hydrolysable group, A is a metal selected from Si, Ti and Zr, m is an integer from 1 to 4). The hydrolysis and/or polycondensation of said metal compound or of pendant $-Y_{m-1}AX_{4-m}$ groups can be carried out simultaneously to the step of reacting the hydroxyl groups of the fluoropolymer and the metal compound or can be carried out once said reaction has occurred. In case of reaction between said fluoropolymer and said metal compound in the molten state, the hydrolysis and/or polycondensation is preferably promoted by injection of water vapour, optionally in combination with a volatile acid catalyst.

SUMMARY OF INVENTION

It has been now found a process for manufacturing fluoropolymer hybrid organic/inorganic composites which enables avoiding use of polluting organic solvents while successfully providing outstanding conversions into fluoropolymer hybrid materials advantageously comprising enhanced amounts of inorganic domains.

It is thus an object of the present invention a process for manufacturing a fluoropolymer hybrid organic/inorganic composite comprising:
(i) partially hydrolysing and/or polycondensing, in the presence of an aqueous medium, a metal compound of formula (I):

wherein X is a hydrocarbon group, Y is a hydrolysable group selected from the group consisting of an alkoxy group, an acyloxy group and a hydroxyl group, A is a metal selected from the group consisting of Si, Ti and Zr, and m is an integer from 1 to 4,
so as to obtain an aqueous medium comprising a pre-gelled metal compound comprising one or more inorganic domains consisting of ≡A-O-A≡ bonds and one or more residual hydrolysable groups Y [compound (M)], and then
(ii) reacting in the molten state at least a fraction of hydroxyl groups of a functional fluoropolymer [polymer (F)] with at least a fraction of hydrolysable groups Y of said pre-gelled metal compound [compound (M)], so as to obtain a fluoropolymer hybrid organic/inorganic composite.

The Applicant has found that fluoropolymer hybrid organic/inorganic composites are successfully obtained by the process of the invention by reacting the polymer (F) and the compound (M) in the molten state, thus avoiding use of polluting organic solvents.

The fluoropolymer hybrid organic/inorganic composite so obtained advantageously comprises one or more inorganic domains consisting of ≡A-O-A≡ bonds.

The Applicant has also surprisingly found that the process of the invention provides outstanding conversions into said fluoropolymer hybrid organic/inorganic composites advantageously comprising enhanced amounts of said inorganic domains and thus exhibiting improved properties, in particular enhanced elastic modulus, scratch resistance and adhesion properties to various materials.

The functional fluoropolymer [polymer (F)] of the invention comprises recurring units derived from at least one fluorinated monomer and at least one comonomer comprising at least one hydroxyl group [comonomer (MA)].

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one comonomer (MA)" is understood to mean that the polymer (F) may comprise recurring units derived from one or more than one comonomers (MA) as defined above. In the rest of the text, the expression "comonomer (MA)" is understood, for the purposes of the present invention, both in the plural and the singular, that is to say that they denote both one or more than one comonomers (MA) as defined above.

The comonomer (MA) of the polymer (F) may be selected from the group consisting of fluorinated monomers comprising at least one hydroxyl group and hydrogenated monomers comprising at least one hydroxyl group.

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

The polymer (F) comprises preferably at least 0.01% by moles, more preferably at least 0.05% by moles, even more preferably at least 0.1% by moles of recurring units derived from at least one comonomer (MA) as defined above.

The polymer (F) comprises preferably at most 20% by moles, more preferably at most 15% by moles, even more preferably at most 10% by moles, most preferably at most 3% by moles of recurring units derived from at least one comonomer (MA) as defined above.

Determination of average mole percentage of comonomer (MA) recurring units in polymer (F) can be performed by any suitable method. Mention can be notably made of acid-base titration methods, well suited e.g. for the determination of the acrylic acid content, of NMR methods, adequate for the quantification of comonomers (MA) comprising aliphatic hydrogens in side chains, of weight balance based on total fed comonomer (MA) and unreacted residual comonomer (MA) during polymer (F) manufacture.

The comonomer (MA) is typically selected from the group consisting of hydrogenated monomers comprising at least one hydroxyl group.

The comonomer (MA) is preferably selected from the group consisting of (meth)acrylic monomers of formula (II) or vinylether monomers of formula (III):

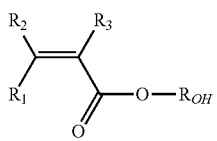

(II)

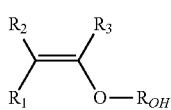

(III)

wherein each of $R_1$, $R_2$ and $R_3$, equal to or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

The comonomer (MA) more preferably complies with formula (II) as defined above.

The comonomer (MA) even more preferably complies with formula (II-A):

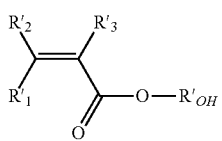

(II-A)

wherein $R'_1$, $R'_2$ and $R'_3$ are hydrogen atoms and $R'_{OH}$ is a $C_1$-$C_5$ hydrocarbon moiety comprising at least one hydroxyl group.

Non limitative examples of comonomers (MA) include, notably, hydroxyethyl(meth)acrylate, hydroxypropyl(meth)acrylate; hydroxyethylhexyl(meth)acrylates.

The comonomer (MA) is most preferably selected among the followings:
hydroxyethylacrylate (HEA) of formula:

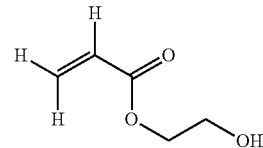

2-hydroxypropyl acrylate (HPA) of either of formulae:

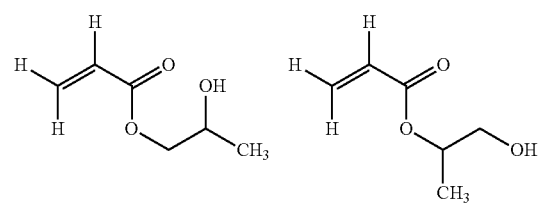

and mixtures thereof.

The polymer (F) may be amorphous or semi-crystalline.

The term "amorphous" is hereby to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Non limitative examples of suitable fluorinated monomers include, notably, the followings:
- $C_3$-$C_8$ perfluoroolefins, such as tetrafluoroethylene, and hexafluoropropene;
- $C_2$-$C_8$ hydrogenated fluoroolefins, such as vinylidene fluoride, vinyl fluoride, 1,2-difluoroethylene and trifluoroethylene;
- perfluoroalkylethylenes complying with formula $CH_2=CH-R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- (per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;
- $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
- (per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$
- functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
- fluorodioxoles, especially perfluorodioxoles.

Non limitative examples of suitable hydrogenated monomers include, notably, non-fluorinated monomers such as ethylene, propylene, vinyl monomers such as vinyl acetate, acrylic monomers, like methyl methacrylate, butyl acrylate, as well as styrene monomers, like styrene and p-methylstyrene.

The polymer (F) comprises preferably more than 25% by moles, preferably more than 30% by moles, more preferably more than 40% by moles of recurring units derived from at least one fluorinated monomer.

The polymer (F) comprises preferably more than 1% by moles, preferably more than 5% by moles, more preferably more than 10% by moles of recurring units derived from at least one hydrogenated monomer different from comonomer (MA).

The fluorinated monomer can further comprise one or more other halogen atoms (Cl, Br, I). Should the fluorinated monomer be free of hydrogen atoms, it is designated as per(halo)fluoromonomer. Should the fluorinated monomer comprise at least one hydrogen atom, it is designated as hydrogen-containing fluorinated monomer.

Should the fluorinated monomer be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from at least one comonomer (MA) as defined above, recurring units derived only from said hydrogen-containing fluorinated monomer, or it can be a copolymer comprising recurring units derived from at least one comonomer (MA) as defined above, said hydrogen-containing fluorinated monomer and from at least one other monomer.

Should the fluorinated monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from at least one comonomer (MA) as defined above, recurring units derived from said per(halo)fluoromonomer and from at least one other hydrogenated monomer different from said comonomer (MA), such as for instance ethylene, propylene, vinylethers, acrylic monomers.

Preferred polymers (F) are those wherein the fluorinated monomer is chosen from the group consisting of vinylidene fluoride (VDF), tetrafluoroethylene (TFE) and chlorotrifluoroethylene (CTFE).

The polymer (F) is more preferably selected from the group consisting of:

polymers (F-1) comprising recurring units derived from at least one comonomer (MA) as defined above, from at least one per(halo)fluoromonomer selected from tetrafluoroethylene (TFE) and chlorotrifluoroethylene (CTFE), and from at least one hydrogenated monomer selected from ethylene, propylene and isobutylene, optionally containing one or more additional comonomers, typically in amounts of from 0.01% to 30% by moles, based on the total amount of TFE and/or CTFE and said hydrogenated monomer(s); and polymers (F-2) comprising recurring units derived from at least one comonomer (MA) as defined above, from vinylidene fluoride (VDF), and, optionally, from one or more fluorinated monomers different from VDF.

In polymers (F-1) as defined above, the molar ratio per(halo)fluoromonomer(s)/hydrogenated comonomer(s) is typically of from 30:70 to 70:30. In polymers (F-1) as defined above, the hydrogenated monomer preferably comprises ethylene, optionally in combination with other hydrogenated monomers.

Polymers (F-1) wherein the per(halo)fluoromonomer is predominantly chlorotrifluoroethylene (CTFE) will be identified herein below as ECTFE copolymers; polymers (F-1) wherein the per(halo)fluoromonomer is predominantly tetrafluoroethylene (TFE) will be identified herein below as ETFE copolymers.

The ECTFE and ETFE copolymers (F-1) preferably comprise:
(a) from 35% to 65% by moles, preferably from 45% to 55% by moles, more preferably from 48% to 52% by moles of ethylene (E);
(b) from 65% to 35% by moles, preferably from 55% to 45% by moles, more preferably from 52% to 48% by moles of at least one of chlorotrifluoroethylene (CTFE) and tetrafluoroethylene (TFE) or mixture thereof;
(c) from 0.01% to 20% by moles, preferably from 0.05% to 18% by moles, more preferably from 0.1% to 10% by moles of at least one (meth)acrylic monomer of formula (II) as defined above.

Among polymers (F-1), ECTFE polymers are preferred.

The polymers (F-2) preferably comprise:
(a') at least 60% by moles, preferably at least 75% by moles, more preferably at least 85% by moles of vinylidene fluoride (VDF);
(b') optionally, from 0.1% to 15% by moles, preferably from 0.1% to 12% by moles, more preferably from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.01% to 20% by moles, preferably from 0.05% to 18% by moles, more preferably from 0.1% to 10% by moles of at least one (meth)acrylic monomer of formula (II) as defined above.

The polymer (F) is even more preferably selected from polymers (F-2) as defined above.

The metal compound of formula $X_{4-m}AY_m$ (I) can comprise one or more functional groups on any of groups X and Y, preferably on at least one group X.

In case the metal compound of formula (I) as defined above comprises at least one functional group, it will be designated as functional metal compound; in case none of groups X and Y comprises a functional group, the metal compound of formula (I) as defined above will be designated as non-functional metal compound.

Mixtures of one or more functional metal compounds and one or more non-functional metal compounds can be used in the process of the invention and in the manufacture of the hybrid composite of the invention. Otherwise, functional metal compound(s) or non-functional metal compound(s) can be separately used.

Functional metal compounds can advantageously provide for hybrid composites having functional groups so as to further modify the chemistry and the properties of the hybrid composite over native polymer (F) and native inorganic phase.

The metal compound of formula (I) as defined above preferably complies with formula (I-A):

$$R'_{4-m'}E(OR'')_{m'} \qquad \text{(I-A)}$$

wherein m' is an integer from 1 to 4, and, according to certain embodiments, from 1 to 3, E is a metal selected from the group consisting of Si, Ti and Zr, R' and R", equal to or different from each other and at each occurrence, are independently selected from $C_1$-$C_{18}$ hydrocarbon groups, optionally comprising one or more functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

With the aim of manufacturing fluoropolymer hybrid organic/inorganic composites which can exhibit functional behaviour in terms of hydrophilicity or ionic conductivity, functional groups of the metal compound of formula (I) will be preferably selected among carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; most preferred will be carboxylic acid group (in its acid, ester, amide, anhydride, salt or halide form) and sulphonic group (in its acid, ester, salt or halide form).

Should the metal compound of formula (I) be a functional metal compound, it more preferably complies with formula (I-B):

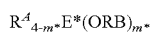   (I-B)

wherein m* is an integer from 2 to 3, E* is a metal selected from the group consisting of Si, Ti and Zr, $R^A$, equal to or different from each other and at each occurrence, is a $C_1$-$C_{12}$ hydrocarbon group comprising one or more functional groups; $R^B$, equal to or different from each other and at each occurrence, is a $C_1$-$C_5$ linear or branched alkyl radical, preferably $R^B$ is methyl or ethyl.

Examples of functional metal compounds are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

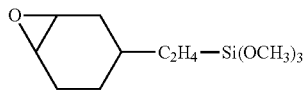

glycidoxypropylmethyldiethoxysilane of formula:

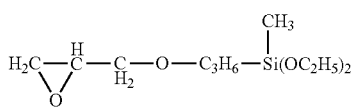

glycidoxypropyltrimethoxysilane of formula:

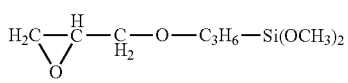

methacryloxypropyltrimethoxysilane of formula:

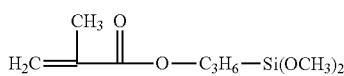

aminoethylaminopropylmethyldimethoxysilane of formula:

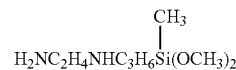

aminoethylaminopropyltrimethoxysilane of formula:

$H_2NC_2H_4NHC_3H_6Si(OCH_3)_3$ 3-aminopropyltriethoxysilane, 3-phenylaminopropyltrimethoxysilane,
3-chloroisobutyltriethoxysilane, 3-chloropropyltrimethoxysilane,
3-mercaptopropyltriethoxysilane, 3-mercaptopropyltrimethoxysilane,
n-(3-acryloxy-2-hydroxypropyl)-3-aminopropyltriethoxysilane,
(3-acryloxypropyl)dimethylmethoxysilane,
(3-acryloxypropyl)methyldichlorosilane,
(3-acryloxypropyl)methyldimethoxysilane,
3-(n-allylamino)propyltrimethoxysilane,
2-(4-chlorosulfonylphenyl)ethyltrimethoxysilane,
2-(4-chlorosulphonylphenyl)ethyl trichlorosilane, carboxyethylsilanetriol, and its sodium salts, triethoxysilylpropylmaleamic acid of formula:

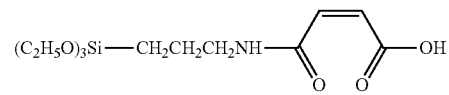

3-(trihydroxysilyl)-1-propane-sulphonic acid of formula $HOSO_2—CH_2CH_2CH_2—Si(OH)_3$, N-(trimethoxysilylpropyl)ethylene-diamine triacetic acid, and its sodium salts, 3-(triethoxysilyl)propylsuccinic anhydride of formula:

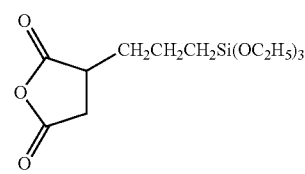

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional metal compounds are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

In step (i) of the process of the invention, the metal compound of formula (I) is partially hydrolysed and/or polycondensed in the presence of an aqueous medium.

By the term "aqueous medium", it is hereby intended to denote a liquid medium comprising water which is in the liquid state at 20° C. under atmospheric pressure.

The weight ratio of the metal compound of formula (I) to the aqueous medium is typically comprised between 50:1 and 1:50, preferably between 20:1 and 1:20, more preferably between 10:1 and 1:10.

The aqueous medium may comprise at least one acid catalyst.

The selection of the acid catalyst is not particularly limited. The acid catalyst is typically selected from the group consisting of organic and inorganic acids.

The aqueous medium typically comprises from 0.5% to 10% by weight, preferably from 1% by weight to 5% by weight of at least one acid catalyst.

The acid catalyst is preferably selected from the group consisting of organic acids.

Very good results have been obtained with citric acid.

The aqueous medium may advantageously further comprise one or more organic solvents (S).

Non-limitative examples of suitable organic solvents (S) include, notably, the followings:
- aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF),
- glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether,
- glycol ether esters such as ethylene glycol methyl ether acetate, ethylene glycol monoethyl ether acetate, ethylene glycol monobutyl ether acetate,
- alcohols such as methyl alcohol, ethyl alcohol, diacetone alcohol,
- ketones such as acetone, methylethylketone, methylisobutyl ketone, diisobutylketone, cyclohexanone, isophorone, and
- linear or cyclic esters such as: isopropyl acetate, n-butyl acetate, methyl acetoacetate, dimethyl phthalate, g-butyrolactone.

For embodiments wherein the aqueous medium comprises one or more further organic solvents (S), the aqueous medium is preferably free from solvents qualified as Carcinogenic, Mutagenic or Toxic to Reproduction according to chemical safety classification (CMR solvents); more specifically, the aqueous medium is advantageously free from N-methyl-2-pyrrolidone (NMP), N,N-diethylacetamide, dimethylformamide (DMF) and N,N-dimethylacetamide (DMAC).

The aqueous medium preferably comprises at least one acid catalyst and one or more organic solvents (S).

The aqueous medium more preferably consists of water, at least one acid catalyst and one or more alcohols.

In step (i) of the process of the invention, the hydrolysis and/or polycondensation of the metal compound of formula (I) as defined above is usually carried out at room temperature or upon heating at temperatures lower than 100° C. The temperature will be selected having regards to the boiling point and/or stability of the aqueous medium. Temperatures between 20° C. and 90° C., preferably between 20° C. and 50° C. will be preferred.

It is understood that, in this step (i) of the process of the invention, the hydrolysable groups Y of the metal compound of formula (I) as defined above are partially hydrolysed and/or polycondensed in the presence of an aqueous medium so as to yield a pre-gelled metal compound comprising inorganic domains consisting of ≡A-O-A≡ bonds and one or more residual hydrolysable groups Y [compound (M)].

As this will be recognized by the skilled in the art, the hydrolysis and/or polycondensation reaction usually generates low molecular weight side products, which can be notably water or alcohol, as a function of the nature of the metal compound of formula (I) as defined above.

The aqueous medium comprising the pre-gelled metal compound [compound (M)] so obtained thus typically further comprises as low molecular weight side products one or more alcohols commonly generated by the hydrolysis and/or polycondensation of the metal compound of formula (I) as defined above.

In step (ii) of the process of the invention, the functional fluoropolymer [polymer (F)] and the aqueous medium comprising the pre-gelled metal compound [compound (M)] are reacted in the molten state at temperatures typically between 100° C. and 300° C., preferably between 150° C. and 250° C., as a function of the melting point of the polymer (F).

It is understood that, in this step (ii) of the process of the invention, at least a fraction of the hydroxyl groups of the functional fluoropolymer [polymer (F)] and at least a fraction of the residual hydrolysable groups Y of the pre-gelled metal compound [compound (M)] are reacted so as to yield a fluoropolymer hybrid composite consisting of organic domains consisting of chains of polymer (F) and inorganic domains consisting of ≡A-O-A≡ bonds.

In step (ii) of the process of the invention, the polymer (F) and the aqueous medium comprising the pre-gelled metal compound [compound (M)] are reacted in the molten state typically using melt-processing techniques.

The polymer (F) and the aqueous medium comprising the pre-gelled metal compound [compound (M)] are reacted in the molten state preferably by extrusion at temperatures generally comprised between 100° C. and 300° C., preferably between 150° C. and 250° C.

Twin screw extruders are preferred devices for accomplishing reactive extrusion of the polymer (F) with the pre-gelled metal compound [compound (M)] in the molten state.

The polymer (F) is preferably fed into the twin screw extruder in an amount comprised between 20% and 99.99% by weight, preferably between 40% and 99% by weight based on the total weight of said polymer (F) and said pre-gelled metal compound [compound (M)].

The reaction to fluoropolymer hybrid organic/inorganic composite usually takes place in the twin screw extruder under constant mixing and kneading. Surplus reaction heat is commonly dissipated through the barrel wall.

The fluoropolymer hybrid organic/inorganic composite is typically obtained under the form of pellets.

Films can then be manufactured by processing the pellets so obtained through traditional film extrusion techniques.

The films so obtained typically have a thickness comprised between 5 μm and 100 μm, preferably between 10 μm and 30 μm.

The fluoropolymer hybrid organic/inorganic composite obtained from the process of the invention advantageously comprises from 0.01% to 60% by weight, preferably from 0.1% to 40% by weight of inorganic domains consisting of ≡A-O-A≡ bonds.

According to an embodiment of the process of the invention, in step (ii) the functional fluoropolymer [polymer (F)] is blended with a non-functional fluoropolymer prior to reaction with the pre-gelled metal compound [compound (M)].

By "non-functional fluoropolymer" it is hereby intended to denote a fluoropolymer comprising recurring units derived from at least one fluorinated monomer and free from comonomers comprising hydroxyl groups.

The selection of the non-functional fluoropolymer is not particularly limited, provided that it does not interact with the pre-gelled metal compound [compound (M)].

The non-functional fluoropolymer is typically added in an amount comprised between 5% and 95% by weight based on the total weight of the functional fluoropolymer [polymer (F)] and said non-functional fluoropolymer.

According to another embodiment of the process of the invention, an inorganic filler (I) is further used in step (i) and/or step (ii).

The inorganic filler (I) may by fed separately or may be added to the aqueous medium comprising the pre-gelled metal compound [compound (M)] or may be blended with the functional fluoropolymer [polymer (F)] and, optionally, with the non-functional fluoropolymer.

The inorganic filler (I) is typically added in an amount comprised between 0.1% and 90% by weight based on the total weight of said inorganic filler (I), the functional fluoropolymer [polymer (F)] and, optionally, the non-functional fluoropolymer.

The inorganic filler (I) is typically provided under the form of particles. The inorganic filler (I) particles generally have an average size of 0.001 μm to 1000 μm, preferably of 0.01 μm to 800 μm, more preferably of 0.03 μm to 500 μm.

The selection of the inorganic filler (I) is not particularly limited; nevertheless, inorganic fillers having on their surface reactive groups towards the pre-gelled metal compound [compound (M)] are generally preferred.

Among surface reactive groups, mention can be notably made of hydroxyl groups.

Among inorganic fillers (I) suitable for being used in the process of the invention, mention can be made of inorganic oxides, including mixed oxides, metal sulphates, metal carbonates, metal sulfides and the like.

Among metal oxides, mention can be made of $SiO_2$, $TiO_2$, ZnO and $Al_2O_3$.

The fluoropolymer hybrid organic/inorganic composite so obtained may be used in several applications.

The fluoropolymer hybrid organic/inorganic composite obtained from the process of the invention may be advantageously used for the manufacture of components for secondary batteries such as separators for Lithium-ion batteries, for the manufacture of ion-conductive membranes for fuel cells or for the manufacture of membranes for filtration.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Manufacture of Polymer (F-A)—VDF-HEA (1.1% by Moles) Copolymer

In a 80 lt. reactor equipped with an impeller running at a speed of 300 rpm were introduced in sequence 52335 g of demineralised water and 17.9 g of METHOCEL® K100 GR suspending agent.

The reactor was vented and pressurized with nitrogen to 1 bar, then 21.5 g of hydroxyethylacrylate (HEA) monomer were introduced in the reactor, followed by 136 g of a 75% by weight solution of t-amyl perpivalate initiator in isododecane and 22646 g of vinylidene fluoride (VDF) monomer. The reactor was then gradually heated to 52° C. to a final pressure of 120 bar. Temperature was maintained constant at 52° C. throughout the whole trial. Pressure was maintained constant at 120 bar throughout the whole trial by feeding a 20 g/l aqueous solution of HEA monomer to a total of 15 lt. After 590 minutes, the polymerization run was stopped by degassing the suspension until reaching atmospheric pressure. The polymer so obtained was then recovered, washed with demineralised water and oven-dried at 50° C.

The VDF-HEA copolymer so obtained (18.3 Kg) contained 1.1% by moles of HEA, as determined by NMR, and had a melt flow index of 11.7 g/10 min (230° C., 5 Kg).

Manufacture of Polymer (F-B)—VDF-HEA (0.2% by Moles) Copolymer

In a 80 lt. reactor equipped with an impeller running at a speed of 300 rpm were introduced in sequence 39160 g of demineralised water and 23.2 g of METHOCEL® K100 GR suspending agent.

The reactor was vented and pressurized with nitrogen to 1 bar, then 21.6 g of HEA monomer and 871 g of diethyl carbonate were introduced into the reactor, followed by 187 g of a 75% by weight solution of t-amyl perpivalate initiator in isododecane and 29043 g of VDF monomer. The reactor was then gradually heated to 57° C. to a final pressure of 110 bar. Temperature was maintained constant at 57° C. throughout the whole trial. Pressure was maintained constant at 110 bar throughout the whole trial by feeding a 2.5 g/l aqueous solution of HEA monomer to a total of 21.7 lt. After 182 minutes, the polymerization run was stopped by degassing the suspension until reaching atmospheric pressure. The polymer so obtained was then recovered, washed with demineralised water and oven-dried at 50° C.

The VDF-HEA copolymer so obtained (21 Kg) contained 0.2% by moles of HEA, as determined by NMR, and had a melt flow index of 7.5 g/10 min (230° C., 2.16 Kg).

Reactive Extrusion—General Procedure

The process of the invention is carried out in a twin screw co-rotating intermeshing extruder (Leistritz 18 ZSE 18 HP having a screw diameter D of 18 mm and a screw length of 720 mm (40 D)).

The extruder is equipped with a main feeder and two degassing units. The barrel is composed of eight temperature controlled zones and a cooled one (at the feeder) that allow to set the desired temperature profile. The molten polymer exits from a die, composed of two holes having each a diameter of 3 mm. The two extrudates are cooled in a water tank. Subsequently, the material is at the same time pulled by a pull roller and dried by compressed air just before being cut-off in pellets by the machine. The screw is composed of a region of conveying elements with a regular decrease of pitch (from zone 0 to 2), then a degassing unit for the developed gases and two other conveying elements (from zone 3 to 4); after this series of elements, six kneading blocks alternated with two conveying elements are located (from zone 4 to 6). Finally, four conveying elements with a second degassing unit are situated before the die exit. The temperature profile used is reported in Table 1 here below.

The extruder speed was 200 rpm.

TABLE 1

| | Zone | | | | | | | |
|---|---|---|---|---|---|---|---|---|
| | 0 | 1 | 2 | 3 | 4 | 5 | 6 | 7 |
| T [° C.] | 90 | 90 | 100 | 120 | 180 | 180 | 180 | 185 |

Determination of $SiO_2$ Content in the Fluoropolymer Hybrid Organic/Inorganic Composite The amount of $SiO_2$ in the fluoropolymer hybrid organic/inorganic composite was measured by Energy Dispersive Spectroscopy (EDS) analysis of Silicon (Si) and Fluorine (F) elements on micrographs obtained from Scanning Electron Microscopy (SEM).

The $SiO_2$ content was determined by using the following equation (1):

$$SiO_2[\%]=[[SiO_2]/([SiO_2]+[F])]\times 100 \quad (1)$$

wherein $[SiO_2]$ and $[F]$ from equation (1) are calculated using the following equations (2) and (3), respectively:

$$[SiO_2]=([Si_{EDS}]\times 60)/28 \quad (2)$$

$$[F]=([F_{EDS}]\times 64)/38 \quad (3)$$

wherein:
  $Si_{EDS}$ and $F_{EDS}$ are the weight % of Si and F obtained by EDS,
  60 is the molecular weight of $SiO_2$,
  28 is the atomic weight of Si,
  64 is the molecular weight of $CH_2=CF_2$, and
  38 is the atomic weight of two F elements.

EXAMPLE 1

Manufacture of VDF-HEA/Silica Hybrid Composite (i) Manufacture of the Pre-Gelled Metal Compound In a 500 ml beaker equipped with a magnetic stirrer running at a moderated speed were introduced in sequence 200 g of tetraethoxysilane (TEOS), 69.45 g of water (TEOS:$H_2O$ molar ratio=4:1), 50 g of ethanol (TEOS:EtOH weight ratio=4:1) and 2.69 g of citric acid (1% by weight based on the total weight of TEOS and water), and left under stirring for three hours at room temperature.

(ii) Reactive Extrusion

The extrusion conditions according to the general procedure as detailed hereinabove were followed.

The pre-gelled metal compound aqueous solution obtained under step (i) of Example 1 was fed using a peristaltic pump in the main feeder of the twin-screw extruder.

The VDF-HEA (0.2% by moles) copolymer [polymer (F-B)] was added thereto at a feed rate of 528 g/h while the pre-gelled metal compound aqueous solution was fed at a feed rate of 472 g/h.

The pre-gelled metal compound aqueous solution was maintained under vigorous stirring during all the process.

The amount of $SiO_2$ in the fluoropolymer hybrid organic/inorganic composite pellets so obtained was 14.5% by weight.

The theoretical amount of $SiO_2$, calculated assuming complete TEOS hydrolysis and/or polycondensation, would be 20% by weight of the fluoropolymer hybrid organic/inorganic composite pellets.

EXAMPLE 2

Manufacture of VDF-HEA/Silica Hybrid Composite

The same procedure as detailed under Example 1 was followed but using a blend of SOLEF® 6008 PVDF homopolymer and the VDF/HEA (1.1% by moles) copolymer [polymer (F-A)] in a weight ratio of 80:20.

The amount of $SiO_2$ in the fluoropolymer hybrid organic/inorganic composite pellets so obtained was 8.8% by weight.

The theoretical amount of $SiO_2$, calculated assuming complete TEOS hydrolysis and/or polycondensation, would be 20% by weight of the fluoropolymer hybrid organic/inorganic composite pellets.

COMPARATIVE EXAMPLE 1

Manufacture of VDF-HEA/Silica Hybrid Composite

The VDF-HEA (0.2% by moles) copolymer [polymer (F-B)] and citric acid in an amount of 0.5% by weight of said polymer (F-B) were fed in the main feeder of the twin-screw extruder at a feed rate of 528 g/h.

An aqueous medium containing 200 g of TEOS, 69.45 g of water and 50 g of ethanol was then fed using a peristaltic pump to the main feeder of the twin-screw extruder at a speed rate of 472 g/h.

The same extrusion conditions as those reported under Example 1 were used.

The amount of $SiO_2$ in the fluoropolymer hybrid organic/inorganic composite pellets so obtained was 2.3% by weight.

The theoretical amount of $SiO_2$, calculated assuming complete TEOS hydrolysis and/or polycondensation, would be 20% by weight of the fluoropolymer hybrid organic/inorganic composite pellets.

It has been thus shown that by the process of the invention fluoropolymer hybrid organic/inorganic composites are obtained that advantageously comprise enhanced amounts of inorganic domains as compared with composites obtained by the processes known in the art.

EXAMPLE 3

Manufacture of a Film

The pellets obtained from the process as detailed under Example 1 were processed by compression moulding at 230° C. in a press obtaining a 300 µm film with an elastic modulus of 1982 MPa.

EXAMPLE 4

Manufacture of a Film

The pellets obtained from the process as detailed under Example 2 were extruded in a Brabender single screw extruder having a diameter of 19 mm and a length to diameter ratio of 25. This extruder was equipped with a flat die having an opening of 100×0.5 mm.

Different temperature profiles giving a range of melt temperatures between 190° C. and 270° C. were set: the higher the temperature, the smoother the final film.

By setting the calendar temperature at 70° C. with a line speed of 0.4 m/min and a screw rotation speed of 20 rpm, a 500 μm film of good quality was obtained.

The invention claimed is:

1. A process for manufacturing a fluoropolymer hybrid organic/inorganic composite, the process comprising:
    (i) partially hydrolysing and/or polycondensing, in the presence of an aqueous medium, a metal compound of formula (I):

wherein X is a hydrocarbon group, Y is a hydrolysable group selected from the group consisting of an alkoxy group, an acyloxy group and a hydroxyl group, A is a metal selected from the group consisting of Si, Ti and Zr, and m is an integer from 1 to 4, so as to obtain an aqueous medium comprising a pre-gelled metal compound comprising one or more inorganic domains consisting of ≡A-O-A≡ bonds and one or more residual hydrolysable groups Y [compound (M)], and
    (ii) reacting in the molten state at least a fraction of hydroxyl groups of a functional fluoropolymer [polymer (F)] with at least a fraction of hydrolysable groups Y of said compound (M), so as to obtain a fluoropolymer hybrid organic/inorganic composite.

2. The process according to claim 1, wherein the metal compound of formula (I) complies with formula (I-A):

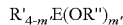 (I-A)

wherein m' is an integer from 1 to 4, E is a metal selected from the group consisting of Si, Ti and Zr, R' and R", equal to or different from each other and at each occurrence, are independently selected from $C_1$-$C_{18}$ hydrocarbon groups, optionally comprising one or more functional groups.

3. The process according to claim 1, wherein polymer (F) comprises recurring units derived from at least one fluorinated monomer and at least one comonomer comprising at least one hydroxyl group [comonomer (MA)].

4. The process according to claim 3, wherein the polymer (F) comprises at least 0.01% by moles of recurring units derived from at least one comonomer (MA).

5. The process according to claim 4, wherein polymer (F) comprises at least 0.1% by moles of recurring units derived from at least one comonomer (MA).

6. The process according to claim 3, wherein polymer (F) comprises at most 20% by moles of recurring units derived from at least one comonomer (MA).

7. The process according to claim 5, wherein polymer (F) comprises at most 3% by moles of recurring units derived from at least one comonomer (MA).

8. The process according to claim 3, wherein comonomer (MA) is selected from the group consisting of (meth)acrylic monomers of formula (II) or vinylether monomers of formula (III):

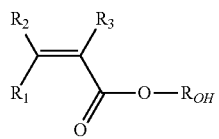

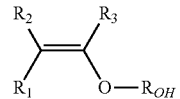

wherein each of $R_1$, $R_2$ and $R_3$, equal to or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

9. The process according to claim 1, wherein polymer (F) is selected from the group consisting of:
    polymers (F-1) comprising recurring units derived from at least one comonomer (MA), from at least one per(halo) fluoromonomer selected from tetrafluoroethylene (TFE) and chlorotrifluoroethylene (CTFE), and from at least one hydrogenated monomer selected from ethylene, propylene and isobutylene, optionally containing one or more additional comonomers, in amounts of from 0.01% to 30% by moles, based on the total amount of TFE and/or CTFE and said hydrogenated monomer(s); and
    polymers (F-2) comprising recurring units derived from at least one comonomer (MA), from vinylidene fluoride (VDF), and, optionally, from one or more fluorinated monomers different from VDF.

10. The process according to claim 9, wherein the polymers (F-2) comprise:
    (a') at least 60% by moles of vinylidene fluoride (VDF);
    (b') optionally, from 0.1% to 15% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and
    (c') from 0.01% to 20% by moles of at least one (meth) acrylic monomer of formula (II).

11. The process according to claim 10, wherein polymers (F-2) comprise:
    (a') at least 75% by moles of vinylidene fluoride (VDF);
    (b') optionally, from 0.1% to 12% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and
    (c') from 0.05% to 18% by moles of at least one (meth) acrylic monomer of formula (II).

12. The process according to claim 10, wherein polymers (F-2) comprise:
    (a') at least 85% by moles of vinylidene fluoride (VDF);
    (b') optionally, from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and
    (c') from 0.1% to 10% by moles of at least one (meth) acrylic monomer of formula (II).

13. The process according to claim 1, wherein the aqueous medium of step (i) comprises at least one acid catalyst.

14. The process according claim 1, wherein the aqueous medium of step (i) further comprises one or more organic solvents (S).

15. The process according to claim 1, wherein the aqueous medium of step (i) consists of water, at least one acid catalyst and one or more alcohols.

16. The process according to claim 1, wherein in step (i) the hydrolysis and/or polycondensation of the metal compound of formula (I) is carried out at room temperature or upon heating at temperatures lower than 100° C.

17. The process according to claim 1, wherein in step (ii), polymer (F) and the aqueous medium comprising compound (M) are reacted in the molten state at temperatures between 100° C. and 300° C. as a function of the melting point of the polymer (F).

18. The process according to claim 17, wherein in step (ii), polymer (F) and the aqueous medium comprising compound (M) are reacted in the molten state at temperatures between 150° C. and 250° C. as a function of the melting point of the polymer (F).

19. The process according to claim 1, wherein in step (ii), polymer (F) is blended with a non-functional fluoropolymer prior to reaction with compound (M).

20. The process according to claim 1, wherein an inorganic filler (I) is further used in step (i) and/or step (ii).

* * * * *